(No Model.)

A. C. McCORD.
CAR COUPLING.

No. 438,275. Patented Oct. 14, 1890.

Witnesses:

Alvin Carr McCord,
Inventor:
by Dodge & Sons,
Attys.

UNITED STATES PATENT OFFICE.

ALVIN CARR McCORD, OF MINNEAPOLIS, MINNESOTA.

CAR-COUPLING.

SPECIFICATION forming part of Letters Patent No. 438,275, dated October 14, 1890.

Application filed April 16, 1890. Serial No. 348,249. (No model.)

*To all whom it may concern:*

Be it known that I, ALVIN CARR McCORD, a citizen of the United States, residing at Minneapolis, in the county of Hennepin and State of Minnesota, have invented certain new and useful Improvements in Car-Couplings, of which the following is a specification.

My invention relates to car-couplings, and has reference more particularly to that class of devices in which there are employed two jaws similar in all respects to each other, which couple automatically as the cars are brought together.

Figure 1:
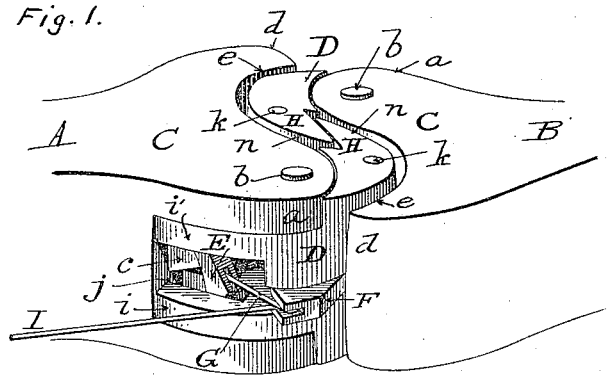
Figure 2:
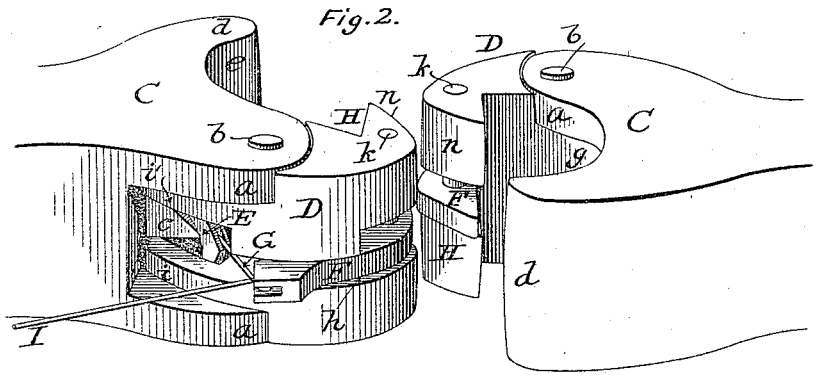
Figure 3:
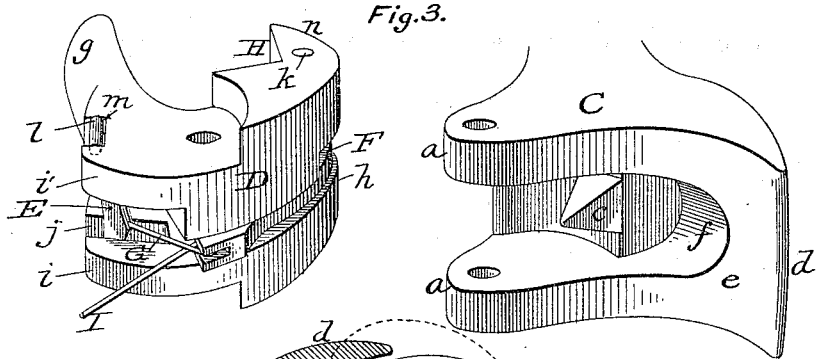
Figure 4:
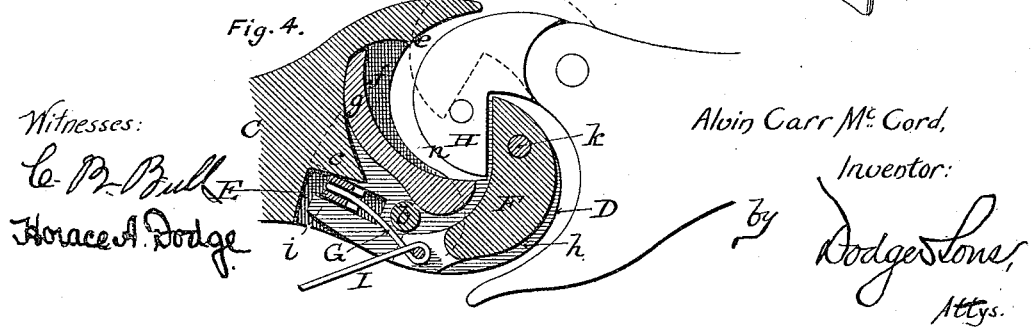

In the drawings, Figure 1 is a perspective view of my improved coupler; Fig. 2, a similar view showing the jaws separated; Fig. 3, a perspective view of the parts separated; Fig. 4, a horizontal sectional view.

A and B indicate the two jaws, which are in all respects duplicates of each other, and as a description of one will apply equally well to both I will now describe in detail only the jaw A. The jaw comprises as its essential features a main body or head C, a pivoted catch or beak D, and a locking pin or dog E. The head or main body C will advisably be made of a single casting and will be provided with two forwardly-projecting ears or lugs $a$, perforated to receive the pin or bolt $b$, upon which the beak oscillates or swings.

In rear of and between the lugs or ears $a$ the main body is provided with a lug or projection $c$, against which the dog E, carried by the pivoted beak, is designed to strike, so as to prevent the latter from swinging outward and uncoupling. On that side of the head or main body opposite the forwardly-projecting lugs the said head is provided or formed with a forwardly-projecting nose $d$, whose front face $e$ is curved, as shown in Figs. 1, 2, 3, and 4, so that the beak of the opposite jaw will be thrown inward as it strikes and rides along the said curved face.

The front face of the main body C, or more properly its nose $d$, will be recessed or provided with a socket $f$, as shown in Figs. 3 and 4, to receive the tail $g$ of the beak D. This pivoted beak is provided with a narrow slot $h$, extending from front to rear, to receive a flat block F, which latter is held in place by a pin or pivot $k$ at the forward end of the block. The beak is further provided with two rearwardly-extending arms $i\ i'$, which are separated to pass, respectively, above and below the lug or projection $c$ on the main body or head C, the lower arm $i$ being slotted lengthwise, as at $j$, to receive and embrace the lower end of the pivoted or swinging locking-dog E. The upper arm $i'$ is provided on its upper face with sockets or bearings $m$ to receive the laterally-projecting journals $l$, formed upon the upper end of the dog E and upon which the latter oscillates, and the said arm is cut away, as shown, to permit the swinging of the dog.

The dog E is connected with the inner end of the block F by means of a link G, so that when the end of the block F (which projects beyond the beveled nose or front edge $n$ of the hook H of the beak) is struck by the corresponding block F or beak D of the opposite jaw it will rock upon its pivot $k$, and in thus rocking draw the lower end of the locking-dog E forward in advance of the lug $c$. A rod I, connected to the block F, extends outwardly to the side of the car, so that the said block and the locking-dog may be actuated or controlled without entering between the cars.

When the jaws are in the position shown in Fig. 4, the hooks H of the respective jaws will be in engagement with each other, and it will be seen that unless the hooks be locked in position they will be free to swing upon their pivots $b$ and thus uncouple. It is to prevent the uncoupling, or rather to lock the hooks in this position, that I employ the locking-dog E. This dog, which is carried by the arms $i\ i'$ of the beak D, is adapted to come into contact with the lug or projection $c$ on the head or body C, and thereby prevent the beak from swinging upon its pivot $b$. Now, when the dog E is swung or moved forward beyond the end of the lug or projection $c$, so that the latter may be passed or cleared by the dog, the beak is free to be swung upon its pivot $b$, as shown by dotted lines in Fig. 4. This movement of the dog may be effected, as before stated, either through the actuation of the rod I or by means of the block F. The tendency of the dog is to remain in a vertical position, and whenever the means employed for throwing its lower end forward are released gravity will return the dog to its normal position. The back face of the lug or projection $c$ is beveled or inclined, and the rear face of the dog is also advisably inclined, so that when the beak D swings into its closed position the dog will be caused to ride up the inclined face of the lug and over the end of the latter.

The jaws may be automatically coupled when either or both of the beaks are locked or unlocked, as will be now explained.

*First. When one of the beaks is locked.*— Assuming that the beak of jaw A is locked and that the beak of jaw B is unlocked, it will be seen that as the two jaws are brought together the tail of the beak of jaw B will strike the nose of the beak of jaw A at the same time that the nose of the beak of jaw B strikes the nose-piece *d* of jaw A; and it will also be seen that (if the movement of the jaws toward each other be continued) the riding of the beak of the jaw B along the curved nose-piece *d* and the pushing inward of the tail of the beak of jaw B will cause the said beak to swing inward and engage the beak of the jaw A. In thus swinging the locking-dog is retracted, as before explained, and by the time that the beak has reached its proper position the dog will have passed over the end of the lug and behind the same, and thereby locked the beak in position.

*Second. Where both beaks are locked.*—In this contingency it will of course be necessary that one or both of the hooks yield or give to allow the other to pass, and to secure this I employ the blocks F, which project beyond the beveled noses *n* of the hooks H of each beak D. Now when the beaks come together the inclined faces *n* will strike the projecting ends of the blocks, rock said blocks upon their pivots *k*, and through the links G actuate the dogs E and release the beaks, so that they may swing upon their pivots *b*. As the movement of the jaws toward each other continues the nose-piece *d* of each jaw, acting in conjunction with the beak of the opposite jaw, throws the beaks inward toward and into engagement with each other, the beaks automatically locking themselves in position, as before.

*Third. When both beaks are unlocked.*—The action that takes place here is just like that which takes place under the arrangement last above described after the beaks have been released, so that they might swing outward to pass each other.

One of the principal advantages of the present construction lies in the fact that as the beveled noses of the beaks come together either one or both of said beaks will be deflected laterally to allow the other to pass, and after passing to automatically come into engagement, the unlocking to permit the lateral movement of the hooks and the locking of the hooks being also performed automatically.

In order to adapt the jaws for use in connection with cars having the common form of coupling, I cut away a portion of the nose or hook of each beak just above the end of the block F, as shown, to receive the coupling-link, the pin *k* in such case serving as the ordinary coupling-pin.

Having thus described my invention, what I claim is—

1. In combination with head C, pivoted beak D, locking-dog E, carried by the beak to engage the head, and a block F, projecting beyond the nose of the beak and connected with the dog, all substantially as shown and described.

2. In combination with head C, having lug *c* and perforated ears *a*, beak D, having arms *i i'* and pivoted to the ears *a*, and dog E, supported by the arms *i i'*, all substantially as shown and described.

3. In combination with head C, having lug *c*, perforated ears *a*, socket *f*, and curved nose *d*, the pivoted beak D, having arms *i i'*, tail *g*, and locking-dog E, all substantially as described.

4. In combination with head C and pivoted beak D, a gravitating dog E, arranged substantially as shown, to engage the head.

5. In combination with head C, having beveled lug *c*, pivoted beak D, provided with dog E.

6. In combination with head C, having lug *c*, pivoted beak D, having arms *i i'*, sockets *m m*, formed in arm *i'*, a slot *j*, formed in arm *i*, and dog E, having lateral arms or journals *l*.

7. In combination with head C, pivoted beak D, provided with a slot *h*, a block F, pivoted in the slot, a locking-dog E, and a connection between the dog and block.

8. In combination with head C, pivoted beak D, having block F and dog E, a connection between the dog and block, and a rod I, extending outward from the block, all substantially as described.

9. In combination with head C, beak D, provided with locking-dog E, block F, and a slot *h*, enlarged at its forward end to receive a link, and a pin *k* for the block, adapted to serve also as a coupling-pin.

In witness whereof I hereunto set my hand in the presence of two witnesses.

ALVIN CARR McCORD.

Witnesses:
W. J. GREER,
WM. H. MORSE.